United States Patent Office 3,473,388
Patented Oct. 21, 1969

3,473,388
ISOKINETIC PARTICLE SAMPLER
Lewis G. Lynn, Rochester, N.Y., assignor to Xerox Corporation, Rochester, N.Y., a corporation of New York
Filed Nov. 1, 1966, Ser. No. 591,181
Int. Cl. G01n 1/00
U.S. Cl. 73—422       8 Claims

ABSTRACT OF THE DISCLOSURE

A method and apparatus to continually divert a representative sample of particulate material from a moving stream by using a sampling tube arranged to receive particulate material from the flow stream. The sampling tube has an inert gas flowing therethrough from an independent source to create an artificial atmosphere therein. The differential pressure between the artificial atmosphere within the sampling tube and the flow stream from which the particles are being diverted is detected. A controller then regulates the pressure within the sampling tube to be substantially equal to the pressure found in the flow stream.

---

This invention relates to method and apparatus for obtaining a true sample of finely divided material which is being transported in a gaseous atmosphere and, in particular, to method and apparatus for obtaining a continuous true sample of such finely divided material which is being moved in a flow system.

Heretofore, when sampling a finely divided material which had been ground or pulverized, it was necessary to collect and store large batches of material. A small sample of the collected batch was then taken and analyzed. This small random sample of the relatively large batch oftentimes represented a spot check rather than a true indication of the total quality of the batch material. To overcome the shortcoming of random sampling, elaborate sampling procedures was devised which required mixing portions from various parts of the batch to make a representative sample which was then further sampled according to a specific procedure. This method of sampling was not only time consuming but expensive.

Batch sampling of finely divided materials has proven unsatisfactory for a number of reasons. First, the batch collected must be withheld from the market until such time as it can be properly analyzed which results in costly storing and handling problems. Second, because of the long time delay between the production of the batch material and the final analysis of the sample, a great amount of defective material can be produced before it is detected. Third, a non-uniformity of product is the result of batch sampling because no rapid and accurate feedback of corrective information is available to maintain the production apparatus within prescribed tolerances. Long time delays and production of large quantities of defective material cannot be tolerated in modern day processes.

Finely divided material which is being discharged freely from a fluid energy grinder or the like is usually allowed to fall under the forces of gravity into a collecting receptacle. Attempts to obtain true samples of these finely divided air entrained particles has proven most difficult because any disruption of the flow patterns will result in an unrepresentative redistribution of the falling particles. That is, any changes in the kinematic conditions of the system will cause the heavier and lighter particles to flow along different path lines depending on the pressure changes occurring along the different paths. Placing a sampling device into the flow is enough in itself to produce changes in the kinematic conditions of the system so that it becomes difficult or impossible to obtain a true and accurate sample of the material moving along the flow stream.

Sampling apparatus which presents a relatively large entrapping area to the flow stream for a short period of time has been used successfully in obtaining fairly representative samples of relatively large particles. Such a device is disclosed by Robinson in U.S. Patent No. 2,370,260. However, when using such a device samples may only be taken periodically and therefore continuous monitoring of the flow stream is impossible. Further, when sampling finely divided material, such a large quantity of material is removed from the system that the sample must be further diluted before it can be properly tested or analyzed. This second resampling step increases the likelihood of erroneous samples being obtained because of the necessity of added handling of the sampling material. This resampling has all the disadvantages of the previously mentioned batch sampling because the sample must be held for a period of time before it can be analyzed.

It is therefore an object of this invention to improve apparatus for recovering a sample of finely divided material being transported in a flow system.

A further object of this invention is to obtain a true sample of finely divided material which is being transported in a flow system.

Another object of this invention is to continually remove a true sample from a flow system containing finely divided materials.

A still further object of this invention is to provide sampling apparatus capable of maintaining conditions at a sampling orifice so that a true sample of minutely or finely divided particles can be obtained.

These and other objects of this invention are achieved by producing conditions at the receiving orifice of a sampling apparatus so that a finely divided particle traveling in a gaseous atmosphere feels no substantial change in the kinematic conditions of the flow and therefore falls freely into the receiving orifice. The particles so collected than being continuously transported away from the orifice in a chemically inert atmosphere.

For a better understanding of this invention as well as other objects and further features thereof, reference is had to the following detailed description of the invention to be read with the accompanying drawings, wherein.

In any substantially laminar flow system, the kinematics, or the geometry of the system's motion, does not change with the passage of time. That is, the velocity, pressure, density, and other dynamic characteristics of the system at any specific point in the system will not vary over a given period of time. This is true whether the force motivating the flow is gravity of a mechanically created head supplied from a pump or the like. However, it should be noted that the kinematics of a steady flow system will vary over a distance due to the forces acting on the flow stream. For example, fluid which is being pumped through a pipe will lose some of its energy because of the work it must expend in moving along the pipe. Therefore, it can be expected that there will be an energy loss downstream from the work source, this energy loss being reflected as a reduction in one or more of the dynamic characteristics of the system.

A laminar flow is best illustrated by a straight and stable column of cigarette smoke as it rises in still air. Likewise, a gas, liquid, or solid which is moving under laminar flow conditions will be moving along substantially straight and stable "path lines." For example, if the path followed by a small or minute particle falling through still air were traced, it would be found that the "path line" described by the particle over a period of time would also be very straight and stable. However, when some outside force is introduced in a laminar flow stream, the kinematics or geometry of the flow stream change because of the disturbance to the path lines.

It can be seen that the introduction of a sampling device into a laminar flow system would force the gas, liquid, or solid in transit to flow around the apparatus thereby disturbing the straight and stable path lines. However, if isokinetic conditions could be maintained along a relatively straight path line which passes through the receiver opening or orifice of the sampling device, a particle of matter moving along this line would sense or feel no disturbing changes in the system and, therefore, would fall freely into the orifice. Collecting a series of these particles as they move along this path line would produce a true sample of the material in transit.

Figure 1:
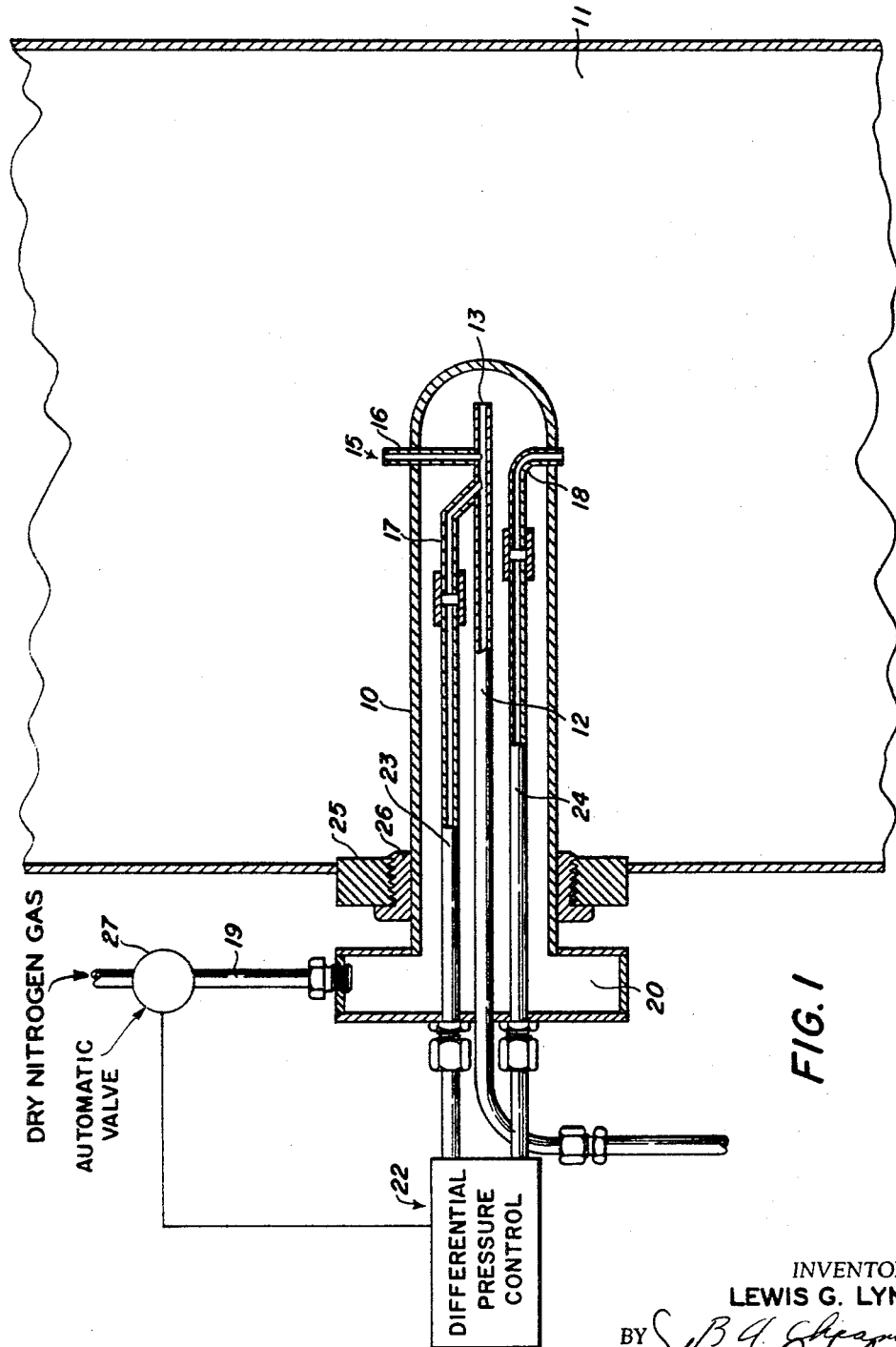
FIG. 1 is a side elevation of the sampling apparatus incorporating the features of this invention.

Referring now to FIG. 1, a sampling device is shown for obtaining a true sample of a freely falling finely divided particle which is leaving the discharge station of a fluid energy grinder or the like. Sampling housing 10 is shown inserted in a straight, round conduit 11 through which the finely divided particles are freely flowing under laminar flow conditions. The housing is placed at some distance from the discharge station of the fluid energy grinder or the like (not shown) at a point in which relatively stable flow conditions are being maintained. The sampling housing is secured in position by means of threaded male member 26 acting in conjunction with mounting block 25 which is permanently affixed to conduit 11. It should be noted that sampling housing 10 acts as an independent unit capable of being removed from the conduit for repairs or the like.

Sample particles are introduced into the housing through orifice 15 located in receiver tube 16. The receiver tube is positioned high enough into the flow stream that it is not affected by any disturbances in the flow caused by housing 10 with the receiver opening 15 positioned so that it cross-sectional area is substantially perpendicular to the straight flow lines thereby permitting free access to particles moving along these path lines. Receiver tube 16 is operationally connected to sampling tube 12 in such a manner that receiver opening 15 empties directly into the sampling tube.

An artificial atmosphere of dry nitrogen gas is maintained within sampling tube 12 as a means of controlling the pressure within the tube as well as a means of transporting particle samples out of the housing. Dry nitrogen is used in this preferred embodiment because it is an economical, readily available, relatively inert gas which will not chemically react with most known materials. It should be obvious, however, that any gas which is relatively inert chemically could be used as an artificial atmosphere. The dry nitrogen is introduced into the system from a reservoir (not shown) through means of nitrogen supply line 19. Because the gas is supplied under some pressure through a relatively small line, there may be a disturbance at the point at which the gas enters the sampling device. Nitrogen line 19, therefore, is emptied first into plenum chamber 20 where stable conditions are established before the gas is supplied to the sampling tube. Sampling tube 10 has an opening 13 at one end through which the dry nitrogen gas is introduced.

As previously noted, if no changes are made in the kinematic conditions found along a straight and stable flow line passing through receiver opening 15, a particle moving along this flow line, sensing no disturbances, would fall freely into the opening. In a flow system comprised of freely falling particles, the kinematics of the system are determined by the elevation of the freely falling particle above a given datum, there being no mechanical pressure or velocity head supplying energy to the system. If the pressure at the receiver opening in sampling tube 12 is maintained at a pressure equal to the pressure found in conduit 11, a particle falling along a path line passing through receiver opening 15 will feel no change in the kinematics of the system and, therefore, flow into the sampling tube 12.

Located immediately adjacent to the receiving tube is pressure tap 17 which is connected to one side of an automatic differential pressure control 22 by means of control line 23. Also located in the sampling housing directly below the orifice is a second pressure tap 18 which is connected to the other side of the automatic differential pressure control by means of control line 24. The pressure information being sent to the pressure control is the pressure in the flow stream adjacent to the sampling housing and the pressure in the artificial atmosphere of dry nitrogen gas which is being maintained in the sampling tube. When a difference in pressure is noted, the automatic differential pressure control transmits a signal to automatic valve 27 located in nitrogen supply line 19, which in turn, opens or closes to maintain equal pressure so that proper sampling conditions are restored.

Figure 2:
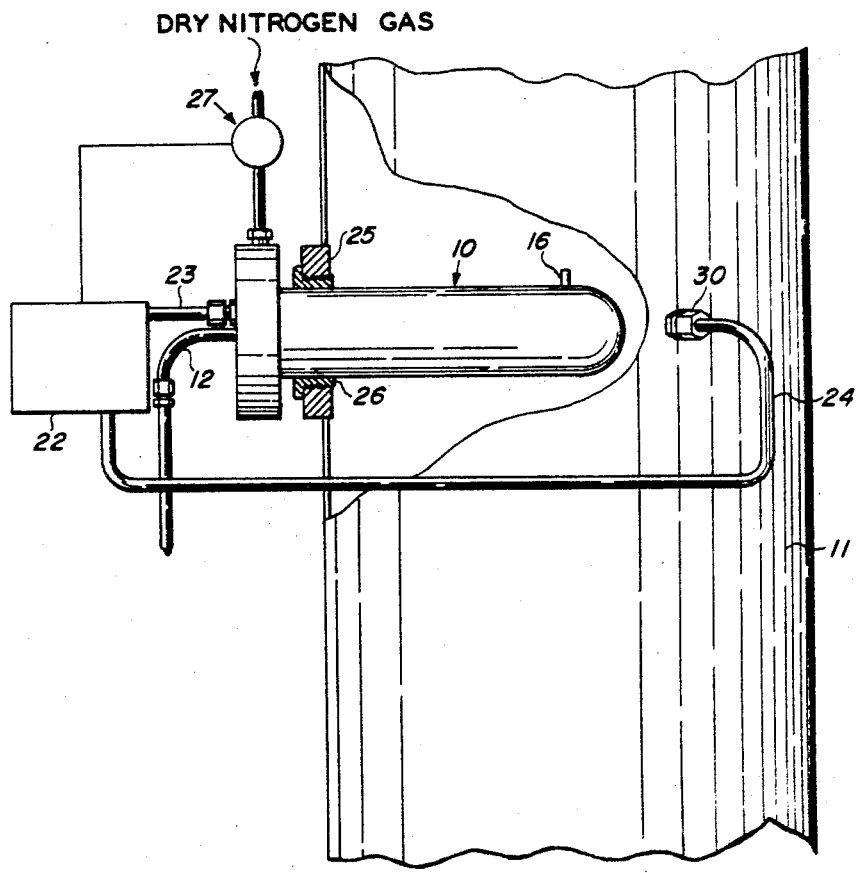
FIG. 2 is an alternate embodiment of the sampling device found in the present invention.

FIGURE 2 shows an alternate embodiment of the present invention in which the sampling device is being employed to obtain a true sample of gas entrained particles moving in a pressure system, that is, a system in which a pressure head is being maintained by a pump or the like. In such a laminar flow pressure system, the gas or fluid which is being forced along a straight conduit loses some of the internal energy imparted to it by the pump due to friction or head loses. Therefore, the pressure downstream from the pump will decrease with distance due to the work expended by the fluid or gas in transit. However, the pressure across the cross-sectional area of the conduit at any given point will be substantially equal. Therefore, a particle riding along a path line will sense a change in pressure ahead but, because the pressure change is substantially equal for every path line as it passes each increment or cross-sectional area, there is no force created which would tend to move a particle from one path line to another. That is, all forces within the system are acting to move the particles forward rather than across path lines.

As shown in FIG. 2, a pressure tap 30 is placed at substantially the same cross-sectional elevation in the conduit as is the receiver opening in sampling tube 12. Pressure tap 30 is connected to one side of automatic differential pressure control 22 while the other side is connected to a pressure tap placed in the sampling tube adjacent to orifice 15. Pressure tap 30 is located at a point in the flow stream where it will not feel any disturbances created by the presence of sampling housing 10. Automatic differential pressure control 22 is now measuring the difference in pressure found at the receiver opening in the sampling tube and the pressure in the stream, both points being equidistant from the pressure source. When a difference in pressure is detected, a signal is sent to the automatic control valve 27 which adjusts the pressure of the artificial atmosphere within the sampling tube to restore equal pressures.

Here again, a particle traveling along a substantially stable and straight path line passing through orifice 15 will sense no change in the rate of change of pressure and, therefore, feeling no disturbing forces influencing its movement will continue to flow along this path line into sampling tube 12. Once captured in the sampling tube, the particle is moved out of the housing in the artificial atmosphere of dry nitrogen.

It has been found that the larger particles captured in the sampling tube tend to migrate and collect at low points in the tube. Therefore, it is advantageous when mounting the sampling device in a horizontal position to place the sampling tube at some slight angle with the horizontal plate so that these particles will readily move out of the housing. The apparatus of the present invention has a self-purging feature capable of removing contamination or particle buildups which might occur. Setting the differential pressure control so that a wide difference between sampling tube pressure and stream pressure is demanded will cause dry nitrogen gas to be blown through tube 13 thereby cleansing the system of any foreign matter that might be present.

While this invention has been described with reference to structure disclosed herein, it is not confined to the details set forth, and this application is intended to cover such modifications or changes as may come within the purposes of the improvements.

What is claimed is:

1. The method of continually diverting a true and representative sample of particulate material from a moving flow stream of material including
    positioning a sampling tube in the stream, said tube having a receiving orifice therein arranged to capture particulate material moving in the stream,
    creating an artificial atmosphere within said sampling tube by moving a continuous flow of fluid therethrough from a source independent of the moving stream,
    detecting the differential in pressure in the flow stream adjacent said sampling tube and in the flow of artificial atmosphere moving through said sampling tube,
    regulating the artificial atmosphere pressure in response to the pressure differential sensed wherein the particles move in an undisturbed flow through said receiving orifice into said sampling tube.

2. The method of claim 1 wherein the fluid making up said artificial atmosphere comprises a gas which is chemically inert with respect to said particulate material.

3. Apparatus for continually diverting a representative sample of particulate material from a moving stream of said material including
    a sampling tube having a fluid receiving station at one end and a fluid discharge station at the other end to provide a relatively closed flow path being capable of supporting a flow of fluid therein,
    means to introduce a continuous flow of fluid at the receiving end of said sampling tube from a source independent of the moving stream whereby an artificial atmosphere is established within said sampling tube,
    a receiving orifice in said sampling tube positioned to receive particulate material moving in a flow of material,
    means to detect a differential in pressure between the fluid in said sampling tube and the pressure in a flow stream of particulate material adjacent to said sampling tube,
    control means being operable by said last recited means to regulate the pressure of the fluid moving through said sampling tube whereby the pressure of the artificial atmosphere is substantially equal to the pressure in the flow stream adjacent to said flow tube.

4. The apparatus of claim 3 wherein said fluid introduced into said sampling tube comprises a gas which is relatively inert in respect to the particulate material.

5. Apparatus for diverting a representative sample of particulate material from a stream of such material including
    a housing having an opening to receive a fluid medium therein and capable of being positioned in a stream of particulate material,
    a flow tube positioned in said housing having a receiving and adapted to communicate with the fluid interior said housing and a discharge end exterior said housing to provide a flow path for the fluid medium,
    a sampling nozzle postioned in said housing having an opening in communication with the flow path through said flow tube and adapted to deliver a sample from a stream of particulate material to said flow tube,
    means to deliver a flow of fluid to the receiver opening in said housing,
    means to measure a differential in pressure in said flow and that in the stream adjacent to said housing,
    and means operable in response to said last recited means to maintain the pressure in said flow tube substantially equal to the pressure in the adjacent stream.

6. The apparatus of claim 5 wherein means are provided for controlling the pressure in the flow tube by regulating the flow of fluid through said housing.

7. The apparatus of claim 6 having further means comprising a plenum in said housing for receiving said fluid medium therein to produce stable flow condition in said fluid prior to its introduction into said flow tube.

8. The apparatus of claim 7 for diverting a representative sample of particulate material from a stream moving in a conduit including
    means to mount said housing in said conduit with the sample nozzle opening facing upstream in the flow of particulate material,
    and the means to measure the differential in pressure positioned to communicate with said flow tube and a stream of particulate material in the conduit in a plane described by the perpendicular bisector of said conduit.

References Cited
UNITED STATES PATENTS

| | | | |
|---|---|---|---|
| 3,011,336 | 12/1961 | Weiss | 73—421.5 XR |
| 1,494,855 | 5/1924 | MacMichael | 73—421.5 |
| 2,452,224 | 10/1948 | Collett | 73—421.5 |
| 2,934,958 | 3/1960 | Kingma | 73—421.5 |

LOUIS R. PRINCE, Primary Examiner

H. C. POST III, Assistant Examiner